United States Patent
Bolignano

(10) Patent No.: US 12,443,716 B2
(45) Date of Patent: Oct. 14, 2025

(54) SECURE CLOUD COMPUTING ARCHITECTURE AND SECURITY METHOD

(71) Applicant: PROVENRUN, Paris (FR)

(72) Inventor: Dominique Bolignano, Paris (FR)

(73) Assignee: PROVENRUN, Paris (FR)

( * ) Notice: Subject to any disclaimer, the term of this patent is extended or adjusted under 35 U.S.C. 154(b) by 399 days.

(21) Appl. No.: 17/624,375

(22) PCT Filed: Jul. 1, 2020

(86) PCT No.: PCT/EP2020/068484
§ 371 (c)(1),
(2) Date: Jan. 3, 2022

(87) PCT Pub. No.: WO2021/001411
PCT Pub. Date: Jan. 7, 2021

(65) Prior Publication Data
US 2022/0358219 A1    Nov. 10, 2022

(30) Foreign Application Priority Data

Jul. 1, 2019 (FR) ........................................ 1907284
Jul. 8, 2019 (FR) ........................................ 1907614

(51) Int. Cl.
G06F 21/57    (2013.01)
(52) U.S. Cl.
CPC ................................... *G06F 21/57* (2013.01)
(58) Field of Classification Search
CPC ....................................................... G06F 21/57
(Continued)

(56) References Cited

U.S. PATENT DOCUMENTS 8,572,735 B2 * 10/2013 Ghosh ................. H04L 63/1416
   709/224
8,997,215 B2 *  3/2015 Guriappa Srinivas .. G06F 21/36
   380/54

(Continued)

FOREIGN PATENT DOCUMENTS

EP    2372974 A1    10/2011

OTHER PUBLICATIONS

Dinh, "A Survey of mobile cloud computing: architecture, applications, and approaches", 2013, Wireless Communications and Mobile Computing, pp. 1587-1611 (Year: 2013).*

(Continued)

*Primary Examiner* — Taghi T Arani
*Assistant Examiner* — Gregory A Lane
(74) *Attorney, Agent, or Firm* — Seckel IP, PLLC

(57) ABSTRACT

A secure cloud computing architecture including: a first data management and/or computer program execution space (A) in which the data management or program execution is controlled by a user; and a second data management and/or computer program execution space (B) in which the data management or program execution is controlled by a third-party operator, first security policies (PSA) applied to the data or execution of programs in the first execution space (A); second security policies (PSB) applied to the data or execution of programs in the second execution space (B); a security property (P) expected by the user, compliance with the first and second security policies guaranteeing a data management and/or computer program execution in accordance with this property (P); and a trusted computing base (TCB) guaranteeing, in the absence of a violation, the application of the second security policies (PSB) in the management of the data and/or execution of the programs in the second execution space (B).

16 Claims, 3 Drawing Sheets

(58) Field of Classification Search
USPC .......................................................... 726/22
See application file for complete search history.

(56) References Cited

U.S. PATENT DOCUMENTS

| | | | |
|---|---|---|---|
| 2007/0271618 A1* | 11/2007 | Chao | H04L 9/3263 |
| | | | 726/1 |
| 2011/0247047 A1 | 10/2011 | Loureiro et al. | |
| 2012/0084438 A1* | 4/2012 | Raleigh | H04L 63/1425 |
| | | | 709/224 |
| 2014/0075567 A1* | 3/2014 | Raleigh | G06Q 30/0283 |
| | | | 726/26 |
| 2014/0137179 A1 | 5/2014 | Christodorescu et al. | |
| 2014/0289796 A1* | 9/2014 | Moloian | H04L 63/101 |
| | | | 726/2 |
| 2015/0143452 A1* | 5/2015 | Hamlen | G06F 21/51 |
| | | | 726/1 |
| 2016/0134424 A1* | 5/2016 | Forget | G06F 21/42 |
| | | | 713/176 |
| 2016/0212128 A1* | 7/2016 | Pike | H04L 63/108 |
| 2019/0028281 A1* | 1/2019 | Turissini | G06F 21/57 |
| 2020/0201779 A1* | 6/2020 | Skertic | H04L 9/38 |

OTHER PUBLICATIONS

Baumann, "Shielding applications from an untrusted cloud with Haven", Oct. 2014, USENIX, pp. 267-280 (Year: 2014).*
International Search Report and Written Opinion dated Sep. 25, 2020 in corresponding application No. PCT/EP2020/068484; w/English partial translation and partial machine translation (total 14 pages).

* cited by examiner

SECURE CLOUD COMPUTING ARCHITECTURE AND SECURITY METHOD

FIELD OF THE INVENTION

The present invention relates to a secure cloud computing architecture comprising a first space for data management and/or computer program execution in which the management of the data or the execution of the programs is controlled by a user and a second space for data management and/or computer program execution in which the management of the data or the execution of the programs is controlled by a third-party operator. It also relates to a method for securing the data and/or the execution of the programs in such a cloud computing architecture.

PRIOR ART

Individuals, businesses and government organisations are increasingly resorting to cloud computing, and this phenomenon should grow in the coming years. Nonetheless, the problem of security and trust arises with increasing severity. Governments in particular care about their sovereignty. For example, the French state has helped two French players, Orange™ Business Service and OVH™, to compete with American giants such as Amazon™ AWS and Microsoft™ Azure in the field of cloud computing. Moreover, companies hesitate to entrust critical data and processing. Indeed, the current solutions do not offer the necessary guarantees, including when these solutions are considered as "sovereign", i.e. as dependent on the states in which said companies are domiciled (Orange™ Business Service or OVH™ in France). Indeed, it is not enough to have a national cloud computing service provider to solve the trust problem, as these themselves have to use foreign hardware and software and above all could make mistakes or be attacked.

SUMMARY OF THE INVENTION

Given the foregoing, a problem that this invention proposes to solve is to provide a method of securing a cloud computing architecture. More particularly, the problem addressed by the invention is a trust problem: how to make a cloud computing architecture in which a user in particular could have full trust or, at least, as much trust as if the architecture were completely under his control.

A first object of the solution proposed in the context of the invention is a secure cloud computing architecture comprising:
 a first space for data management and/or computer program execution in which the management of the data and/or the execution of the programs is controlled by a user;
 a second space for data management and/or computer program execution in which the management of the data or the execution of the programs is controlled by a third-party operator,
 characterised in that it further comprises:
 first security policies applied to the data or to the execution of the programs in the first execution space;
 second security policies applied to the data or to the execution of the programs in the second execution space;
 a security property expected by the user, compliance with said first and second security policies guaranteeing data management and/or computer program execution in accordance with this property; and
 a trust base guaranteeing, in the absence of violation, the application of the second security policies in the management of the data and/or the execution of the programs in the second execution space, said trust base comprising, on the one hand, a hardware part having observers indicating unauthorised access and, on the other hand, a software part, said software part being made available to the user and/or to a trusted third party. These indicators are visible to the user and could possibly cause securing of the system.

Thus, when the user executes a program at least in part in the second execution space, and the observers indicating access remain blank, then this user can be sure that the execution of this program meets the property.

Advantageously: —the trust base comprises a hardware security module, said hardware security module enabling the user to select a certifier (at least amongst a list of possibilities) to represent him, and the software part of the trust base is made available to the user or his representative; —the software part of the trust base and the manner of rebuilding it is provided or made available to the user and/or to trusted third parties; —the trust base is part of a hardware security module whose software core, namely its most complex part, has been formally proven; —means are provided to the user to enable him to be convinced that all of the execution paths of the software part of the trust base guarantee compliance with the second security policies, under normal operating conditions; —the architecture comprises a subset which comprises one or several physical server(s) forming the space (B), a hardware part and/or the software base of the trust base forming hardware security modules being associated to said servers; further includes a hardware part of the trust base forming an additional security box, this additional box being disposed at the entrance of the subset and having means for filtering data packets entering the subset, this filtration including checking up that said data packets comply with a security policy, i.e. that of the execution environment (B).

A second object of the invention is a method of securing a cloud computing architecture comprising the steps according to which:
 a first space for data management and/or computer program execution is provided in which the management of the data and/or the execution of the programs is controlled by a user;
 a second space for computer program execution is provided in which the management of the data and/or the execution of the programs is controlled by a third-party operator;
 first security policies are applied to the data and/or to the execution of the programs in the first execution space;
 second security policies are applied to the data and/or to the execution of the programs in the second execution space;
 a security property expected by the user is defined, compliance with said first and second security policies guaranteeing data management and/or computer program execution in accordance with this property;
 a trust base is provided guaranteeing, in the absence of any violation, the application of the second security policies in the management of the data and/or the execution of the programs in the second execution space, said trust base comprising, on the one hand, a hardware part having observers indicating unauthorised access and, on the other hand, a software part, said software part being made available to the user and/or to a trusted third party; and in that the management of the data and/or the execution of the programs performed by the user at least in part in the second execution space is deemed to meet the property expected by the user, if the observers indicating access remain blank.

Advantageously: —the software part of the trust base and the manner of rebuilding it is provided or made available in its entirety to the user and/or to the trusted third-party.

BRIEF DESCRIPTION OF THE FIGURES

The invention will be better understood upon reading the following non-limiting description, made with reference to the appended drawings, wherein.

DETAILED DESCRIPTION OF THE INVENTION

The invention relates to a cloud computing architecture. In general, such an architecture comprises a set of virtual servers, each virtual server being associated with one or several virtual memory disk(s), each virtual memory disk being materialised by one or several physical memory disk(s), said physical memory disks being contained in physical computer servers. A user accesses the service provided by the cloud computing architecture, for example by means of a personal computer, or a server that he controls, or a telephone via a network of the Internet type or of the 3G, 4G or 5G type.

Figure 1:
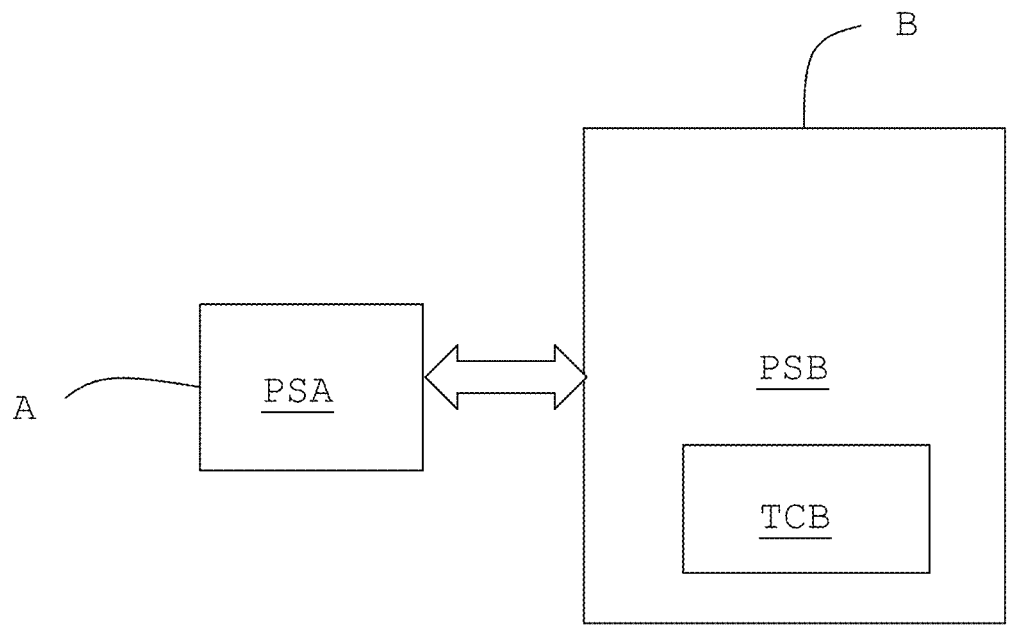
FIG. 1 is a diagram illustrating an architecture according to the invention.

As shown in FIG. 1, the architecture according to the invention comprises a first space or environment A for managing data and/or executing computer programs. In this first space, the data, as well as the manner in which they are managed, and the execution of the programs is controlled by a user or client or interested party, said user being for example a natural person, a company, a government organisation, an operator, or a set formed by such entities, for example a user who is a natural person and his company, having access to at least some services provided by the cloud computing architecture. For example, the first space A is the user's workstation: a physical server, a multifunction mobile telephone ("smartphone"), a personal computer.

The architecture further comprises a second space or environment B for managing data and/or executing computer programs. For example, this space B is a room comprising a set of physical servers provided with physical disks typically disposed at the operator or the provider of cloud services, and therefore remote. In this second space, the management of the data and/or the execution of the programs is done by an operator. The operator's control over the data and/or the program execution is total or partial. For example, this operator is a cloud computing service provider or a computer infrastructure supplier. This operator is not controlled by the user. In practice and in general, the user buys the services he wants within the architecture from the operator.

In the case of the present invention, the user does not trust or does not fully trust the third-party operator because he does not completely control the management of his data and/or the programs that he executes in the space B.

In the architecture according to the invention, the first security policies PSA are applied to the management of the data and/or to the execution of the programs in the first execution space A.

Security policies should be understood as expected behaviour in the data management and/or program execution spaces. These are sets of security rules which define, for example, for the data and/or the programs contained in the architecture, the confidentiality, the integrity and, advantageously, the availability. These rules can also define acceptable behaviours. For example, a file of the user managed by the operator will always be stored in an encrypted manner with a key forming part of the trusted base and which will never leave an HSM ("Hardware Security Module") forming a box. This file could potentially be decrypted by the HSM or the hardware security module in an isolated space, i.e. a security domain, typically dynamically created by the hardware security modules of FIG. 3A or 3B, to be subsequently processed on behalf of the user, then the result will be re-encrypted by the HSM or hardware security module, to be stored outside the trusted base (i.e. the TCB) by the operator, then the space—the security domain—will be erased and the space freed or, in other words, the used machines could be assigned by the operator to other tasks. Possibly, a security policy could also be defined in XML XCCDF language (eXtensible Configuration Checklist Description Format), which is part of the SCAP (Security Content Automation Protocol) specifications from NIST (National Institute of Standards and Technology). This language allows representing a structured set of security rules so as to support the exchange of information relating to security and consequently to generalise good security practices. In one example, confidentiality can be maintained, according to a security policy, that is to say a rule, by the systematic encryption of the data. In this simple example, the rule is "systematically encrypt the data". This is not the encryption key. In another example, integrity could be maintained, according to a security policy, by monitoring the configuration files of an application. In this case, the rule is "monitor the configuration files of an application". In still another example, the availability could be managed, according to a security policy, by implementing a redundant architecture. The rule is then "implement a redundant architecture". In general, a security policy includes a plurality of rules: "systematically encrypt data AND monitor the configuration files of an application AND implement a redundant architecture". In general, the security policies according to the invention apply not only to data but also to computer programs or applications.

In the architecture according to the invention, second security policies PSB are also applied to the management of the data and/or to the execution of the programs in the second execution space B.

According to the invention, a security property P is expected by the user for the management of his data and/or the execution of computer programs in the first space A but also in part or totally in the second space B that he does not trust or in which he has limited trust. This property P is such that compliance with the first PSA and second PSB security policies guarantees data management or execution of computer programs in accordance with this property P. Optionally, such a property could be described as a security policy. For example, a sensitive file could be processed without being encrypted in the space A, but still according to the rules defined above outside, in the space B and the rest of the cloud architecture.

Moreover, the architecture according to the invention comprises a trust base TCB. This trust base is a subset of the execution space B. The trust base TCB comprises a hardware part, namely a physical subset comprising for example one or several computer(s)/server(s)/physical processor(s) and/or memory disk(s), memory area(s), etc. Moreover, it comprises a software part including data and/or programs. In general, this software part is a small subset of the space B. It should be noted that the execution space A could also comprise a trust base TCB.

The trust base guarantees the application of the second security policies PSB in the management of the data and/or the execution of the programs in the second execution space B. To this end, the trust base has means for indicating unauthorised access. More particularly, the hardware part of this base has such means. Hence, it is "tamper evident". If an unauthorised access to the base is performed and this, irrespective of the causes, in particular an attack or a degradation of operation, whether intentional or not, and if as a result, a potential or effective violation of the second security policies PSB exists, then observers indicating this access will be activated so that this access will be visible in the same manner as seals. The term violation should be understood in a broad sense including in particular all intrusions, degradations, thefts or unauthorised modifications of data or the programs or corruptions. The indicator observers indicate unauthorised access to the trust base or a compromise of the integrity of the base. A violation due to unfulfilled assumptions (for example an unsuitable cryptographic algorithm) will not necessarily lead to an actuation of the indicator. In one example, and for the implementation of the aforementioned seal functions, the trust base comprises a hardware security module ("Hardware Security Module" or HSM). It consists of a hardware component considered tamper-proof, which generally offers cryptographic functions. However, it should be noted that a particular software module such as a software security module can fulfill some or all of the aforementioned functions in addition to or instead of an HSM. Hence, in the context of the invention, the user can always check a posteriori the violation observers for the physical part, for example a machine room, equipment, etc., and inspect the authenticity and conformity of the trust base of the third-party operator B. If the violation indicators are blank, he will be able to ensure that the expected behaviours have been met and that his security objective has indeed been met, yet without trusting the operator. In doing so, the user be assisted—or use the services—of a third party, whom he is ready to trust).

According to the invention, the software part of the trust base is made available to the user and/or to a trusted third party. For example, this software part and, in particular, at least, its part on a rewritable medium, and the means for rebuilding it, for example the source code, the compiler, the generators, will be provided or made available in its entirety to the user and/or to third parties who assist him, namely evaluators, certifiers, consultants, etc. and whom the user is ready to trust, in particular because he will have typically selected them. Similarly, means are provided to the user, such as documentation, arguments, means of proof, etc., that enable a person skilled in the art to audit a priori—certain checks could nonetheless be postponed to be done a posteriori—compliance with the announced security properties with an accuracy and detail level allowing convincing oneself that all the execution paths of this software part of the trust base guarantee compliance with the second security policies PSB, under normal operating conditions of the hardware part of said base, and subject to compliance with the underlying assumptions, for example resistance of a cryptographic algorithm, the quality of a random number generator, etc. It should also cover all possible versions/configurations, in particular when the trust base of the third-party operator B might be subject to updates. To convince oneself in particular of compliance with the second security policies PSB in the presence of software having an infinite number of possible execution paths, one could, depending on the case, call upon formal check techniques, for example formal proofs, or perform code proofreading or exhaustive testing when the low complexity of the software or of the concerned part of the software allows so. Advantageously, one should also be able to recreate and/or validate the set of possible fields or a superset thereof and be convinced that the second security policies are actually met in all cases.

In fine, according to the invention, if the first security policies PSA are met, the expected overall operation, i.e. the normal operation, in the absence of a successful attack, of this trust base will comply with the second security policies PSB, and will consequently allow meeting P.

Example of a Hardware Security Module (HSM) Forming a Trust Base

It is possible to imagine applying the invention to make new generation HSMs that would be much more flexible in use and would considerably reduce the role of the HSM manufacturer in the chain of trust. In particular, they would allow:

the user to select the certifier, and to control the customisation,
the software trust base of such an HSM is clearly identified and available for review,
the HSM can be used in turn for several users under the control of an untrusted third-party operator,
and are programmable with new processing functions.

Advantageously, it is also possible to guarantee that all the trust that one places in the manufacturer of HSMs is entirely auditable: for example, it will be enough for auditing to check that the HSM supplied by the manufacturer does actually contain the expected (hardware or software) elements, for example without having to trust the compliance with a security policy that cannot be checked (or that is difficult to check). This last point will be clarified using a next example.

The execution space B then comprises this new generation HSM which could moreover be advantageously implemented from a ProvenCore™ "tamper resistant" hardware security module. Indeed, the ProvenCore™ box has a trust root, an OS and auditable security applications. The software part of the box will typically form a part of the software trust base for which the means such as the documentation, the arguments, the means of proof to be provided in the context of the invention exist and have in particular for the most part been developed for the needs of the CC EAL7 referenced assessment of ProvenCore™. Typically, the hardware part of this hardware security module will form part of the hardware trust base.

Figure 2A:
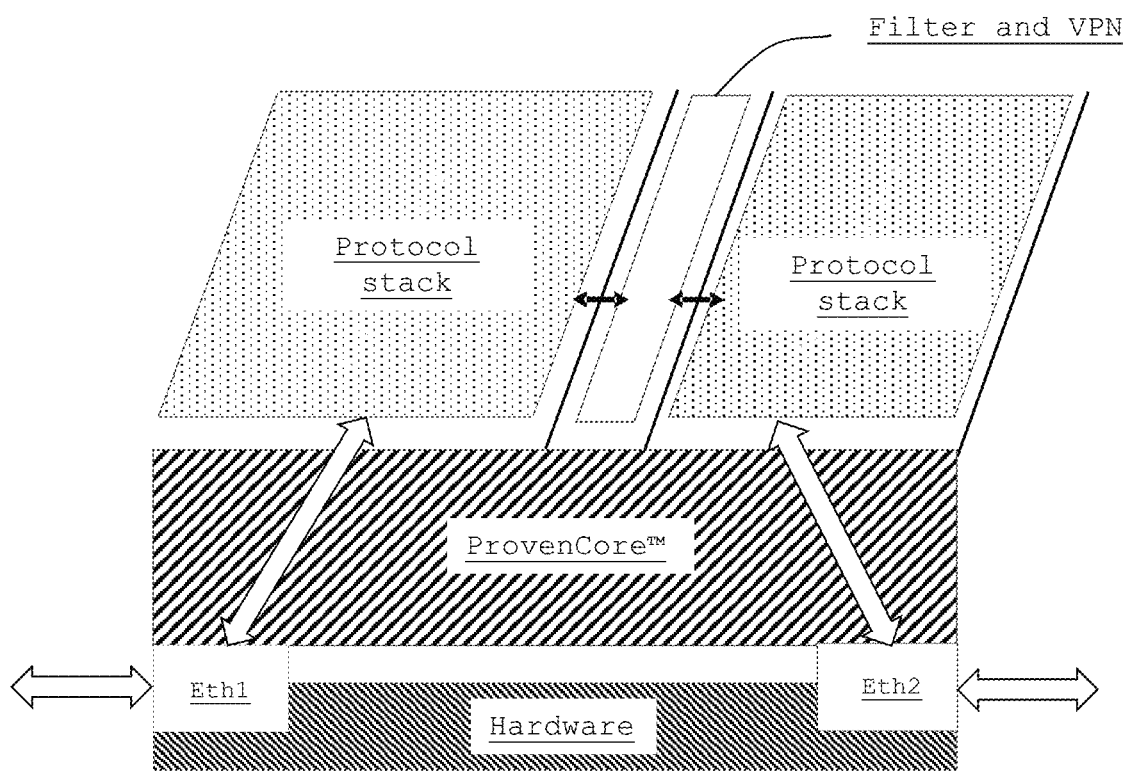
FIG. 2A is a schematic representation of a first example of a hardware box comprising a formally proven core of the ProvenCore™ type, likely to be implemented in an architecture according to the invention, said box being provided with filtering means and being likely to form a VPN.
Figure 2B:
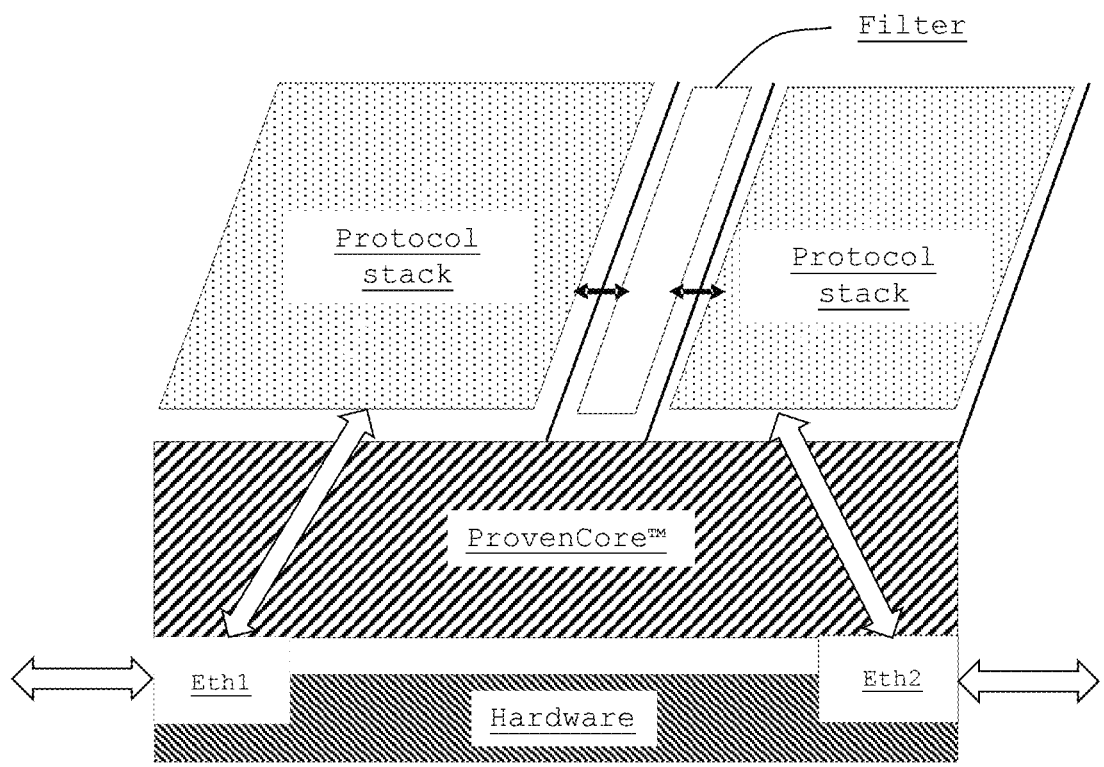
FIG. 2B is a schematic representation of a second example of a hardware box including a core formally proven of the ProvenCore™ type, likely to be implemented in an architecture according to the invention, said box being provided with filtering.

Examples of ProvenCore™ boxes for filtering are shown in FIGS. 2A and 2B. They include herein a hardware part referenced "Hardware" in the figures, provided with Ethernet ports Eht1 and Eth2, and carrying a proven core formally referenced "ProvenCore™" in the figures, said proven core being capable of implementing or possibly filtering protocol stacks referred to as "Protocol stacks", the filtering being implemented by means of a filter of the hardware security module associated (FIG. 2A) or not (FIG. 2B) to a VPN (Virtual Private Network). Other ProvenCore™ hardware security modules may have other vocation than filtering and may host other applications. In this case, they could have other hardware peripherals. For example, a hardware security module having an HSM vocation could embed security applications for secure storage, cryptography, etc. Such hardware security modules can also combine different functionalities at the same time.

As regards the customisation of the HSM, an identity, its certificate and potentially some other root data are typically introduced during the initialisation phase of the HSM. One way to do so is to have a pre-customisation step in which we insert the identity of the HSM, insert or generate an asymmetric key pair for the HSM, as well as certificates or public keys associated to each user and which will enable him later on to create his own trust root, all this under the control of the different users or of their trusted third parties who will be required to use this HSM, knowing that this last step could actually be avoided, as this will be explained later on in the present description, using transport keys or passwords. Typically, the aforementioned pre-customisation step will require physical proximity to the HSM. Afterwards, the users can remotely customise the HSM, in turns, for their own needs and thus create their own trust root. In doing so, the user will for example have to create a trusted channel with the HSM using, for example, a security of the transport layer ("Transport Layer Security" or TLS) with double authentication with asymmetric keys distributed beforehand. Typically, this customisation will lead to the generation of one or several encryption key(s). Typically, these keys, as well as the private keys dedicated to the user, will never leave the HSM in cleartext. On the other hand, it will be possible to encrypt them on the HSM to save them outside, whether temporarily between two sessions of the same user and then restore them on the same HSM or another one or to restore a damaged HSM. To save and restore these keys on the same HSM, we will typically use a private key known only to the HSM (or to a set of HSMs forming a trusted family), to save for restoration a damaged HSM we will use for example to encrypt the backups of the keys specific to each user, for example, a public key of the user, or more specifically a symmetric key generated by the HSM and encrypted with the public key of the user so that the latter is the only one able to re-customise a replacement HSM that will recover the data.

In the above example, the need for giving to third parties, a fortiori humans, the even transitory knowledge of critical secrets has been avoided, because it is very difficult to audit compliance with the good security policies of these third parties. We know how to audit software or hardware equipped with the right auditing means (documentations, etc.) but generally not processes carried out by third parties except by constantly monitoring them. To further reduce the needs for operations requiring the physical presence of the user or his trusted third party during the installation or the preparation of the HSM, it is possible for example to use an auditable functionality that will allow launching the remote customisation using a single-use secret. For example, upon receipt of this single-use secret (password, transport key, etc.) encrypted with its public key, the HSM will start its customisation (generation of keys, etc.), will create an entity that it will bind to the user, with conventional mechanisms preventing "man-in-the-middle attacks". If the secret has been compromised by the operator, the user will realise it. In this case, the operator would have had access to a critical secret but he will not be able to use it without the user noticing it before he finishes the customisation of his space in the HSM. This single-use secret will no longer have any use afterwards.

We see herein that the software trust base is not necessarily present in its entirety at all times. Herein, the software used for pre-customisation or for customisation could disappear when it is no longer useful. Similarly, some parts of the trust base are not yet loaded during initialisation. Similarly, in the event of the possibility of updating the software trust base, the different versions are not generally kept in the on-board system that used them. But the audit should be able to be done on the entire software used throughout the service life of the product, which means that it is necessary to be able to reconstitute all these versions and parts at the time of the audit or audits/evaluations. Typically, the revisions of the trust base will not exist at the time of the audit/evaluation and will have to be audited either a priori at the time of their installation or a posteriori which implies that the auditor has a global and accurate view of the forms that the software trust base could take over time. In general, this also requires the backup of all of these used versions.

Examples of Cloud Computing Architectures According to the Invention

For the following three examples, the same basic architecture will be used. It is described herein. The cloud services provider, namely the third-party operator according to the invention, supplements its existing architecture made according to the prior art by adding specific rooms. These specific rooms made according to the invention are rooms forming an execution space B. Typically, they receive the same servers and equipment as the servers and equipment of a conventional room, but also include the means defined for the architecture according to the invention, in order to define an execution space B under tighter control of the users (a company, or a user organisation) for certain aspects of its security.

In these specific rooms, the service provider, namely the operator, will typically impose certain specific security rules on himself: for example, he will take into account the notion of "security domain". Such security domains will, in essence, be dynamically associated with users wishing to perform one or several sensitive operation(s) (for example operations on sensitive data). Thus, a security domain will be associated with (i.e. will be the property of) a single user. For example, the service provider will refrain from using the same server at the same time to execute different security domains or belonging to different users. For example, it will be necessary to delete the data from the servers before reassigning them to other security domains or users, or at the end of use, etc.

Typically, a specific room will also be created or prepared under the control of the user or of one or more of his trusted third parties. It will be generally inviolable ("tamper evident"). Indeed, once the room is created under the control of the user or his trusted third parties, the room will typically be sealed so that a physical access or a successful physical attack to the room necessarily leaves traces that the user or its trusted third parties will be able to see during his regular checks. For more responsiveness, it is also possible to imagine a security camera system controlling specific rooms and permanently consultable by the user, a system itself "tamper evident" and to be checked during regular inspections.

The specific room is provided with means in accordance with the invention. For this purpose, for example, hardware security modules are used that the supplier adds alongside the servers of his usual infrastructures and which will allow implementing and/or controlling the rules imposed by the service provider so as to allow compliance with the properties.

Figure 3A:
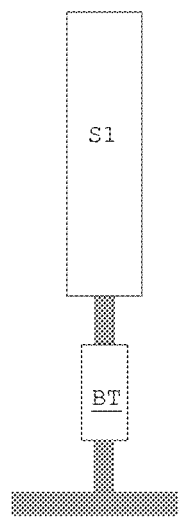
FIG. 3A is a schematic representation of a specific room according to the invention, including a server, and a hardware security module of the type of the hardware security modules shown in FIG. 2A or 2B, participating in the trust base and allowing carrying out different partitions, internal and with the outside.
Figure 3B:
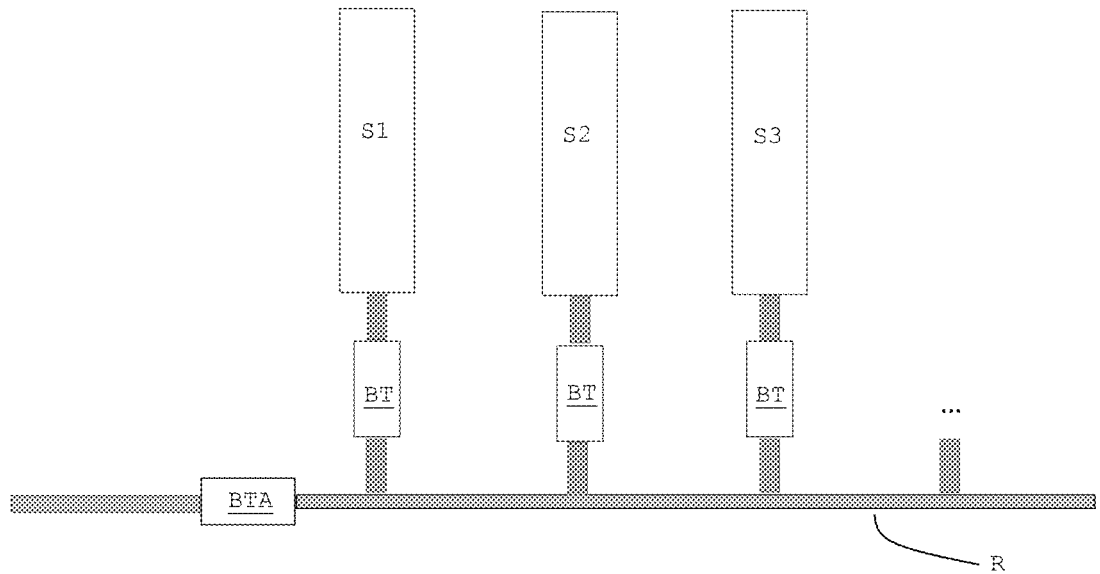
FIG. 3B is a schematic representation of a specific room according to the invention, including a plurality of servers, and a set of boxes of the type of boxes shown in FIG. 2A or 2B, participating in the trust base and allowing carrying out different partitions, internal and with the outside.
Figure 3C:
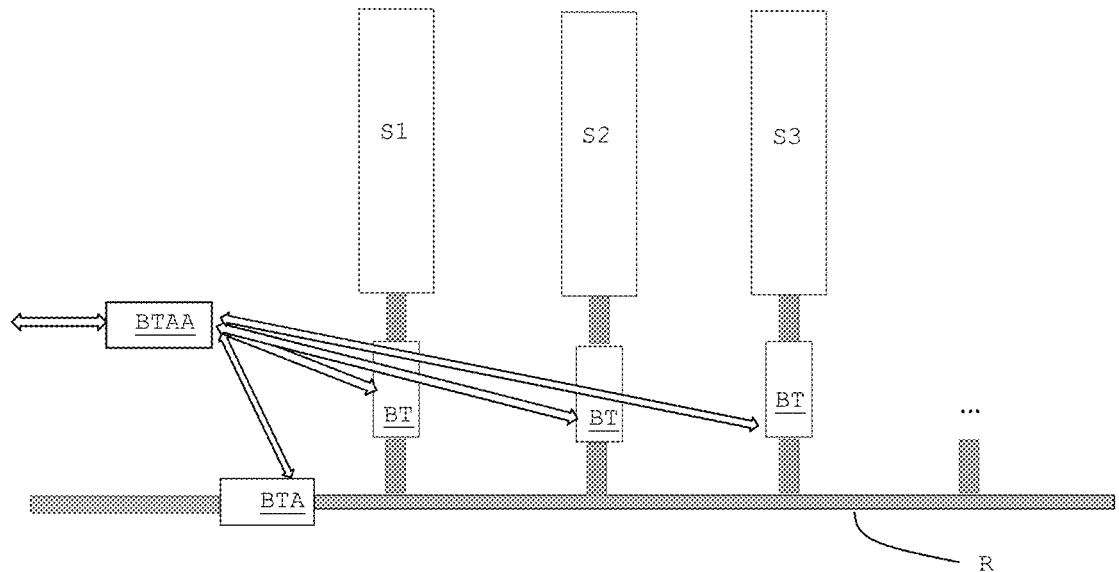
FIG. 3C is a schematic representation of a specific room according to the invention, including a plurality of servers, and a set of boxes of the type of boxes shown in FIG. 2A or 2B, participating in the trust base and allowing carrying out different partitions, internal and with the outside.

FIG. 3B shows a specific room of a cloud computing architecture comprising servers S1, S2 and S3, said servers being arranged in a network R, a hardware security module or box of the type presented in FIGS. 2A and 2B being disposed upstream of each server S1, S2 and S3, and an additional box BA being disposed at the entrance to the room. FIG. 3C shows the same room in which, in addition again, an additional box, BAA again, controls all or part of the boxes disposed upstream of the servers S1, S2 and S3, as well as the additional box shown in FIG. 3B. FIG. 3A shows a specific room comprising a unique server S1 and a unique hardware security module.

Preferably, the hardware security modules or boxes B, BA, BAA are "tamper evident" modules comprising a computer card based on ProvenCore™ as described in the literature "Security Filters for IoT Domain Isolation", Dominique Bolignano, Embedded Conference, 2018; "Security Filters for IoT Domain Isolation", Dominique Bolignano, Florence Plateau, ISoLa, 2018. The ProvenCore™ core, its launch chain and, more generally, its chain of trust, some of its applications will typically enter the software trust base of the operator B. For example, these hardware security modules authenticate filter the commands and incoming data in the specific room in order to check that they comply with the rules imposed by the cloud provider and, more generally, comply with the security policies PSB. Typically, they filter and control all network access for each machine in the cloud computing architecture of the specific room. For example, one could use the hardware security modules described in the paper on the filter. Also, they will potentially have other functions such as certain server administration functions (for example emptying and preparing security domains) which would not be done remotely.

Typically, the hardware security module enabling communication with the outside should be capable of authenticating and opening secure channels (first hardware security module), while the others will not necessarily need so (second hardware security module). Of course, this architecture could be optimised by duplicating certain hardware security modules to improve the performances or to combine some of them. It is also possible to combine several hardware security modules into one (by creating hardware security modules with multiple peripherals and multiple functions). You can also use a dedicated network (in red) to control/administer the hardware security modules. Typically, the specific rooms that have just been described are protected rooms in buildings. You can also create a specific room by putting a server and one or several hardware security module(s) in a "tamper evident" box. Such a room, including a server S1 and a hardware security module BT is shown in FIG. 1. This specific room will then be movable like a server. It can be prepared by a manufacturer under the control of the user or his trusted third party, sealed and then placed in a standard room of the service provider like any other of its servers.

In general, ProvenCore™ based hardware security modules are capable of:
  executing security applications such as filtering, updating, authentication, secure storage, server provisioning, and data controlled by the hardware security module, network interface control, USB, power supply, . . . , server integrity control, (including off the trust base), i.e. HIDS by relying on a TPM or a probe or VPN.
  configuring the topology of the machines, in particular the virtual servers of the specific room in which they are included, or to allow only certain commands or information to pass into said room or into said machines/servers. They could also be used to administer a machine in particular a server and for example to initialise it, reboot it, load it with a new configuration before reboot, etc.). For example, to execute a certain service on a user's critical data, it will be necessary to assign "cloud server 1" to this user. The corresponding hardware security module will isolate the selected server and prepare it for the session (it will empty it, initialise it with the right software and the right data that it must have looked for and decrypted with keys that only the hardware security modules will be able to obtain, etc.). For this purpose, it could play the role of a filter (but this assumes that the cloud administers these servers differently, which is generally undesirable) or else of a proxy (the hardware security module will receive commands that it will execute if they are allowed by translating them where needed).
  potentially serving as a hardware security module HSM, and above all the ProvenCore™ hardware security modules have a software part of the trust base and the way to reconstruct it is provided or made available in its entirety to the user and/or to trusted third parties.

Example of a Cloud Architecture of a Company with Services Such as Spreadsheet Services, Editors, Tools Working on Data that are Sensitive for the User, Such as for Example a Healthcare Application.

In this case, the user is the user company or organisation.

The space A is a computer or the internal network of the company. The user is ready to trust the operator B for its quality of service but not for the security of its data.

At some times, whether it is because it is given regular possibilities to check or because it is given the possibility of spontaneously provoking these opportunities, it performs—or makes perform—checks, in particular checks of violation observers). Furthermore, if desired, the user checks up the software part of the trust base of B, in particular if certain checks have not been done a priori, or if an additional check of the trust base seems to be useful. A person trusted by the company can do it himself by relying for certain parts on an Information Technology Security Assessment Centre (CESTI), or any other assessor or certifier he trusts. The trusted person checks the seals and or the state of the site, for example checks that it has all the versions and applications of the trusted database, checks or makes evaluate/assess certain security applications that have not been so, can perform certain checks of the operations of administrations that would have been carried out by the site B and which are also part of the trust base, for example ask which version is used or which are the applications that have been loaded.

But the main checks will typically be done at the beginning:

check of the physical tightness of the space, check of the presence of the correct violation observers/indicators.

check that the combination of the two security policies PSA and PSB potentially combined with underlying assumptions (which seem to be acceptable to the user) actually allows meeting the selected security objective, accurate identification of a subset of the software of B (and its possible evolutions) which is kept entirely which could be used if the observers of B are not violated, for a posteriori check allowing to be convinced that the security objective has been booked (subject to compliance with PSA): for example check of all used versions of the TCB, check that they had been properly evaluated by the user or his trusted evaluator, re-evaluation where necessary by certain parties. The trust base will be for a large part the software of the hardware security modules (Proven-Core, its applications, etc.)

check that the architecture allows the conservation of the versions of the trust base (different versions of Proven-Core of its applications, etc.), check that the quality of the arguments allows reaching the desired trust level, at this time, we will typically have paired the server rooms with the different users. Afterwards, one could load or configure on his own an HSM that will be associated with us, or one could use the new generation HSMs described in the first described use case.

The data of the user can be stored in the standard cloud space (sensitive data are encrypted by keys and the sensitive data like keys never circulate in cleartext in normal cloud space).

When a user needs to execute a service in the cloud architecture requiring the implementation of a security, for example the edition or processing of a confidential document, the encrypted file which is typically in the standard architecture is retrieved in a specific room according to the invention, meeting the correct constraints. Other files required for processing may also be retrieved (for example, database). A new security domain is typically created, which usually implies that a hardware security module and a server are momentarily assigned to the task. The hardware security module creates a closed area, i.e. a security domain, loads (or controls the loading of) the proper edition or processing software, creates the protective barriers with the outside (depending on the case isolates the domain or lets him to access certain external information), creates a secure communication channel with the user to enable interaction with him, and to enable certain data exchanges or not, etc., properly initialises the set, and performs all of the associated administration operations. In particular, certain versions of processing software or of the underlying OS (for example Linux) may be explicitly requested by the user, but typically will not be part of the trust base. Indeed, potential bugs in this part of the software could certainly exist, but if the security domain in which this software stack will run is properly isolated, they cannot be easily exploited by a hacker, and the user will typically accommodate with and will not need to apply the same constraints thereto, because typically the security properties that he wants (for example confidentiality) will be guaranteed by the security architecture, even in the presence of a bug. He will find himself in the situation he would have been in by executing the function at home (without calling on the cloud) on a properly configured and protected machine.

Example of an Architecture in which the User Requests Services Such as Spreadsheet or Editor Services, the User being a Simple User Who is a Natural Person.

The space A is the computer of the user. A is ready to trust B for its quality of service but not for the security of its data.

The user can choose that a CESTI, a certifier, or a trusted person whom he trusts has checked the specific room(s) he is going to use, which means that the cloud service provider will have called upon a sufficient number and variety of trusted third-party organisations so that users of the intended marketing target could find an acceptable third party therein.

Example in which the Architecture is a Telephone Network of the 3G, 4G or 5G Type For example, the user is the telecom operator. But the used equipment (for example infrastructures, base stations, etc.) are very complex objects that will form the space (B) which are under the control of the operator, but also in a certain way of the supplier, because the latter could have authorised or unauthorised access to the equipment (updates, sending of operations, etc.). The operator herein is the user according to the invention while the infrastructure supplier will be the operator according to the invention because the latter could potentially modify, operate, listen, or control through hidden channels. A hacker other than the service provider could also play the role of an operator according to invention. The outside world (the supplier of the equipment as well as all the other actors) can also play this role according to the invention. The invention will allow offering trust to the user (the network operator herein).

Example of an Embedded Chip with a Security Field

Execution environment (A): A well-controlled system or sub-system that we trust to perform a certain processing (typically sensitive processing i.e. confidentiality or security).

Execution environment (B): Less controlled, connected on-board computer which could potentially be hacked (typically by the operator according to the invention) and which will perform certain processing operations that are critical for the system (A).

Operator B: the actors in the value chain who collectively develop this onboard computer (chip manufacturer, equipment supplier, device manufacturer, etc.) or a hacker exploiting a flaw left by one of them.

Solution: The (one) processor of the computer (B) has at least one security space. For example, on ARM™ Cortex A architecture-based chips, this space could be that of the TrustZone™, but unlike what is usually done, the security OS, i.e. the TEE, the boot chain (the Secure boot, part of the boot loader), the monitor code will form part of the software TCB in the context of the invention and should be treated as such according to the invention. This will involve in particular an accurate identification of the software TCB, and a particular processing thereof. In particular, the manufacturer of the chip must provide all of the software TCB or enough information for it to be properly assessed by various third parties.

But above all, the software used in the upstream customisation and boot phase should also be included in the TCB (even though they disappear for reasons related to lack of space). It is also necessary to include the different versions when the trust base can be updated. As regards the upstream phases, it is possible to imagine (1) we trust the hardware (which must have some kind of "tamper evidence") and we have a minimal ROM (and documented and which could potentially be scanned in privileged mode (2) or we use a "removable" chip fitted with a hardware module security "tamper evident" that we put when we receive the object, the telephone or the automotive ECU for example (the "removable" chip will be put like a SIM like a SIM). Hence, whether using a phone or an "tamper evident" computer or not, we will have a slot to put a removable chip containing all or part of the TCB.

ARM™ Cortex A architecture-based chips are just one example. In certain new generations of chips, whether ARM-based or not, several security spaces can be created (the iMX8™ from NXP™, or certain multi or "many" core architectures, such as that of the new European processor developed in the context of EPI, i.e. European Processor Initiative). These security spaces are generally obtained by programming the memory controller. Typically, the software that will make configurations and/or these controls will also form part of the software trust base of (B) in the context of the invention.

Example of Critical Information Feedback and/or Deep Learning in the Cloud

The use of the cloud for the feedback and processing of sensitive data (for example for deep learning) is often considered problematic, in particular for the respect of privacy. The two aspects described in the examples "remote chip with security domain" and "cloud architecture and their specific rooms" can be combined. The on-board security space (B) (for example in an ADAS computer for autonomous driving in the motor vehicle which has access to a lot of sensitive data for the driver) communicates securely with a security domain in a specific room of the cloud (another part of (B). For example, the execution space (A) will consist of all of the car's better-mastered computers that supply sensitive data to the ADAS computer (vehicle position, camera data, etc.). Typically, the user will be the driver/manufacturer pair.

EXAMPLE

Use of the Unused Power in Onboard Application (for Example a Processor of a Car when Parked)

A security space is used on the unused on-board processor to carry out processing operations on behalf of the cloud (or the computers of the user). The cloud or the computers of the user form herein the space (A) which will for example use this unused power of (B) for cryptocurrency mining or any other intensive processing, and the unused processor (or calculator) is (B), for example the main "many" core processor of a new generation car. The owner of the car rents this unused power to the miner (i.e. the user) who, without having control of this on-board processor, is assured of compliance with certain security properties.

The invention claimed is:

1. A secure cloud computing architecture comprising:
a first execution space (A) for data management and/or computer program execution in which the management of the data and/or the execution of the programs is/are controlled by a user; and
a second execution space (B) for data management and/or computer program execution in which the management of the data or the execution of the programs is controlled by a third-party operator;
first security policies (PSA) applied to the data or to the execution of the programs in the first execution space (A);
second security policies (PSB) applied to the data or to the execution of the programs in the second execution space (B);
a security property (P) expected by the user, compliance with the first and second security policies guaranteeing data management and/or computer program execution in accordance with the security property (P); and
a trust base (TCB) guaranteeing, in the absence of violation, the application of the second security policies (PSB) in the management of the data and/or the execution of the programs in the second execution space (B), wherein the trust base comprises:
a hardware part having observers indicating unauthorised access,
wherein the trust base comprises a hardware security module comprising the hardware part of the trust base, and
a software part, the software part being made available to the user and/or to a representative of the user and/or to a third party trusted by the user,
wherein the observers indicating unauthorised access are visible to the user and/or the representative of the user and/or the third party trusted by the user,
wherein means are provided to the user to enable the user to be convinced that all of the execution paths of the software part of the trust base guarantee compliance with the second security policies, under normal operating conditions,
wherein the architecture further includes a hardware part of the trust base forming an additional security module (BTA), the additional security module being disposed at the entrance of a subset of servers and having means for filtering data packets entering the subset, the filtration including checking up that the data packets comply with a security policy.

2. The architecture according to claim 1, wherein the hardware security module enables the user to select a certifier to represent the user.

3. The architecture according to claim 1, wherein a manner of rebuilding the software part of the trust base is provided or made available to the user and/or to the representative of the user and/or to the third third party trusted by the user.

4. The architecture according to claim 1, wherein a software core of the hardware security module has been formally proven.

5. The architecture according to claim 1, comprising an infrastructure comprising the subset which comprises one or several physical server(s) forming the space (B), wherein a hardware part and/or the software base of the trust base forming box(es) (BT) is/are associated to the servers.

6. The architecture according to claim 1, wherein the hardware part of the trust base is provided or made available to the user and/or to the representative of the user and/or to the third party trusted by the user.

7. A method of securing a cloud computing architecture, the method comprising:
providing a first execution space (A) for data management and/or computer program execution in which the management of the data and/or the execution of the programs is/are controlled by a user;
providing a second execution space (B) for computer program execution in which the management of the data and/or the execution of the programs is/are controlled by a third-party operator;

applying first security policies (PSA) to the data and/or to the execution of the programs in the first execution space (A);

applying second security policies (PSB) to the data and/or to the execution of the programs in the second execution space (B);

defining a security property (P) expected by the user, compliance with the first (PSA) and second (PSB) security policies guaranteeing data management and/or computer program execution in accordance with the security property (P);

providing a trust base (TCB) guaranteeing the application of the second security policies (PSB) in the management of the data and/or the execution of the programs in the second execution space (B), wherein the trust base comprises:
a hardware part having observers indicating unauthorised access, wherein the trust base comprises a hardware security module comprising the hardware part of the trust base, the hardware part of the trust base forming an additional security module (BTA), the additional security module being disposed at the entrance of a subset of servers and having means for filtering data packets entering the subset, the filtration including checking up that the data packets comply with a security policy, and a software part, the software part being made available to the user and/or to a representative of the user and/or to a third party trusted by the user, wherein the observers indicating unauthorised access are visible to the user and/or the representative of the user and/or the third party trusted by the user;

and wherein wherein the management of the data and/or the execution of the programs performed by the user at least in part in the second execution space (B) is/are deemed to meet the security property (P) expected by the user, if the observers indicating access remain blank, and wherein means are provided to the user to enable the user to be convinced that all of the execution paths of the software part of the trust base guarantee compliance with the second security policies, under normal operating conditions.

8. The method according to claim 7, wherein the software part of the trust base and the manner of rebuilding the software part of the trust base are provided or made available in its entirety to the user and/or to the representative of the user and/or to the third-party trusted by the user.

9. The architecture according to claim 2, wherein a manner of rebuilding the software part of the trust base is provided or made available to the user and/or to the representative of the user and/or to the third party trusted by the user.

10. The architecture according to claim 8, wherein a manner of rebuilding the software part of the trust base is provided or made available to the user and/or to the representative of the user and/or to the third party trusted by the user.

11. The architecture according to claim 2, wherein a software core of the hardware security module has been formally proven.

12. The architecture according to claim 3, wherein a software core of the hardware security module has been formally proven.

13. The architecture according to claim 2, comprising an infrastructure comprising a subset which comprises one or several physical server(s) forming the space (B), wherein a hardware part and/or the software base of the trust base forming box(es) (BT) is/are associated to the servers.

14. The architecture according to claim 3, comprising an infrastructure comprising a subset which comprises one or several physical server(s) forming the space (B), wherein a hardware part and/or the software base of the trust base forming box(es) (BT) is/are associated to the servers.

15. The architecture according to claim 4, comprising an infrastructure comprising a subset which comprises one or several physical server(s) forming the space (B), wherein a hardware part and/or the software base of the trust base forming box(es) (BT) is/are associated to the servers.

16. The architecture according to claim 3, wherein providing or making available the manner of rebuilding the software part of the trust base to the user and/or to the representative of the user and/or to the third party trusted by the user include providing or making available a source code and/or a compiler and/or generators used in rebuilding the software part of the trust base.

* * * * *